United States Patent
DeLand et al.

(10) Patent No.: US 6,364,281 B1
(45) Date of Patent: Apr. 2, 2002

(54) METHOD OF ENERGIZING SOLENOID OPERATED VALVES

(75) Inventors: Daniel L. DeLand, Davison; Andrew W. Westergaard, Rochester; Kenneth J. Parker, Lake Orion; Roger L. Kennedy, Jr., Oakland, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/533,567

(22) Filed: Mar. 22, 2000

(51) Int. Cl.[7] .............................................. F16K 31/02
(52) U.S. Cl. ......................... 251/129.04; 251/129.08; 361/154; 361/187
(58) Field of Search ......................... 361/153, 154, 361/187; 251/129.04, 129.08

(56) References Cited

U.S. PATENT DOCUMENTS

| | | | | |
|---|---|---|---|---|
| 3,535,596 A | * | 10/1970 | Mecklenburg et al. ...... | 361/154 |
| 4,103,695 A | * | 8/1978 | Aono ................ | 251/129.08 X |
| 4,813,443 A | * | 3/1989 | Pounder ............ | 251/129.08 X |
| 4,970,622 A | * | 11/1990 | Buchl .......... | 361/154 |
| 5,179,496 A | * | 1/1993 | Mimura ....................... | 361/154 |
| 5,202,813 A | * | 4/1993 | Uoto et al. .................. | 361/154 |
| 5,746,178 A | * | 5/1998 | Susaki et al. ....... | 251/129.04 X |
| 5,781,397 A | * | 7/1998 | Schrey ........................ | 361/154 |
| 5,933,313 A | * | 8/1999 | Furukawa .................... | 361/154 |
| 6,176,212 B1 | * | 1/2001 | Vilou .................... | 361/154 X |
| 6,188,561 B1 | * | 2/2001 | Heimberg ................... | 361/154 |

* cited by examiner

Primary Examiner—Joseph A. Kaufman
Assistant Examiner—John Bastianelli
(74) Attorney, Agent, or Firm—Roger A. Johnston

(57) ABSTRACT

A solenoid operated valve is controlled upon increasing energization for greater flow by incrementing by a small fraction of the maximum current a target current level for the desired flow for a short duration followed by energization at the target level. Upon decreasing energization for lesser flow, the valve is energized at a target current decremented by a small fraction of the maximum current for a short duration. The result is a nearly negligible hysteresis.

6 Claims, 4 Drawing Sheets

METHOD OF ENERGIZING SOLENOID OPERATED VALVES

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to the operation of solenoid actuated devices, in particularly solenoid actuated valves, where it is desirable to have the flow through the valve proportional to the actuating current for the solenoid.

Proportionally operated solenoid valves have found widespread application in automotive engine controls where it is desired to have the engine computer control flow of fluid for engine control, as for example, in controlling the flow of fuel vapor from a storage canister into the engine inlet. In such applications precise control and linearity of response of the valve is necessary to maintain the fuel/air mixture for the engine to maintain fuel economy and control of emissions from engine combustion over a wide range of engine operating conditions of RPM and load.

In the operation of a solenoid operated valve, hysteresis is encountered between the flow through the valve responsive to a given solenoid current for increasing current and the flow through the valve for the same current level upon decreasing current. The amount of hysteresis although relatively small is significant in applications where precise flow control is required. Where the valve is employed for controlling flow of fuel vapor to the engine intake manifold, the deviations in flow through the solenoid operated valve experienced on increasing and decreasing current to the solenoid can result in improper combustion of the engine.

It has therefore long been desired to provide a way or means of minimizing the hysteresis effects of increasing and decreasing current flow in a solenoid where the solenoid is employed for the operation of a fluid flow control valve; and, this has been particularly desired for such a valve employed for the control of fuel vapor flow from a canister into an internal combustion engine inlet. It has further been desired to provide such a way or means of improving the linearity or proportionality of a solenoid operated valve in a manner which is easy to incorporate in the electronic engine controller and which is not prohibitively costly for high volume automotive production.

BRIEF SUMMARY OF THE INVENTION

The present invention provides a method of controlling the flow of current to a solenoid operated valve in a manner which produces flow through the valve proportional to the solenoid current in a manner which minimizes or substantially eliminates the effect of hysteresis in controlling current between zero and maximum flow conditions for the valve. The present invention utilizes a set of target values of current for the desired flow through the valve which are established by calibrating the valve at various steady state values of current. During operation, as the current is changed in the valve for flow control purposes when it is desired to increase the flow through the valve, the current is first increased above the target value for the desired current for a relatively short duration of time and then decreased to the target value. Where it is desired to decrease the flow of the valve, the current is decreased for a relatively short duration of time below the desired target value for a short duration and then increased to the target value. The technique of the present invention has been found to reduce the hysteresis to a level which is not significant in the operation of the valve and provides flow through the valve which is substantially linear or proportional to the current flow in the valve from zero to maximum current flow through the solenoid for the range of currents encountered in service. The method of the present invention may be readily incorporated in an electronic controller for controlling current flow through the valve particularly for valves operated on a relatively low voltage such as that encountered in automotive applications and with no additional electrical or structural changes required of the valve.

DETAILED DESCRIPTION OF THE INVENTION

Figure 1:
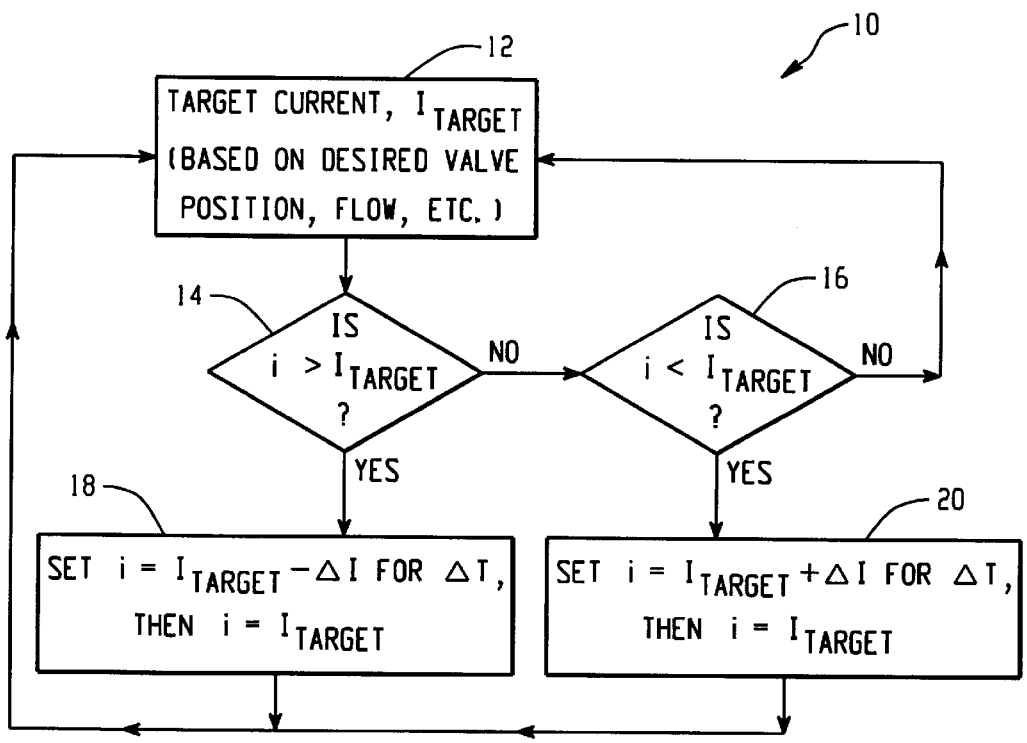
FIG. 1 is a flow diagram of the operation for establishing target values for the valve during calibration.

Referring to FIG. 1, a valve actuated by a solenoid is energized in accordance with the control strategy indicated generally at 10 in FIG. 1.

Figure 2:
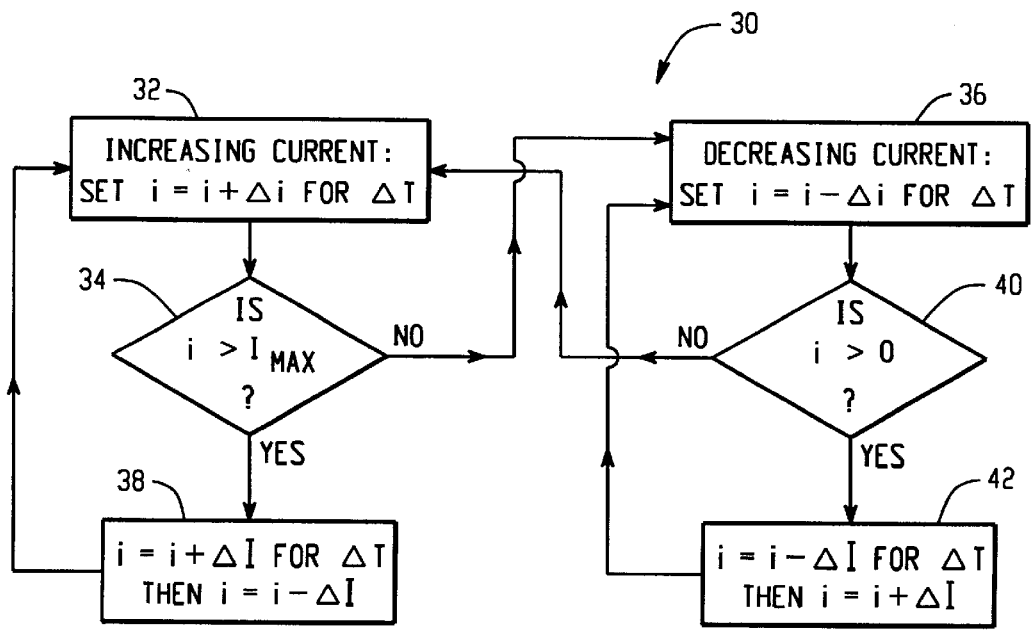
FIG. 2 is a flow diagram of the control strategy of the present invention.

With respect to FIGS. 1 and 2, the following notation is employed.

I: instantaneous current to the device.

$I_T$: target current for desired valve position/flow.

$\Delta I$: overstep amount $\Delta T$: overstep duration $\Delta i$: sweep step amount $\Delta t$: time between sweep step increments $\Delta i/\Delta t$: sweep step rate The system is energized at step 12 at the target value of I determined from steady state current calibrations of a similar valve on a flow test stand, as will hereinafter be described. The system then proceeds to step 14 and asks whether the instantaneous current i is greater than the target current $I_T$. If the answer is negative, the system proceeds to step 16 and inquires whether the instantaneous current i is less than $I_T$. If the answer is affirmative in step 14, the system proceeds to step 18 and decrements the instantaneous current by an amount ΔI subtracted from the target current $I_T$ and maintains this decremental current for a period of time ΔT and then sets the instantaneous current equal to $I_T$. The system then proceeds to return to step 12.

If the determination in step 16 is negative, the system returns to step 12; however, if the determination at step 16 is positive, the system proceeds to step 20 and sets the instantaneous current equal to the target current $I_T$ incremented by an amount ΔI for a period of time ΔT, then sets the instantaneous current equal to $I_T$ and returns to step 12.

The electrical control strategy or algorithm of FIG. 1 thus increments or decrements the instantaneous current by an amount ΔI for a period of time ΔT added to or subtracted from the target current, as the case may be, depending upon whether the current to the valve is to be increased or decreased.

Referring to FIG. 2, the current sweep employed during calibration of a valve to be operated in accordance with the present invention is indicated generally at 30 where at step 32 the instantaneous current is incremented by an amount Δi for a time interval ΔT the system then proceeds after expiration of the time period ΔT to step 34 and inquires whether the instantaneous current is less than $i_{max}$. If the determination in step 34 is negative, the system proceeds to step 36 and decrements the instantaneous current for an amount Δi for time interval ΔT.

If the determination at step 34 is in the affirmative, the system proceeds to step 38 and increments the instantaneous current by an amount ΔI for the time interval ΔT, then decrements the instantaneous current by an amount ΔI.

If the determination at step 36 is affirmative, the system proceeds to step 40 and inquires as to whether the instantaneous current is greater than zero; and, if the determination is negative, the system returns to step 32. However, if the determination at step 40 is affirmative, the system proceeds to step 42 and decrements the instantaneous current by an amount ΔI for a time period ΔT and then increments the instantaneous current by an amount ΔI and returns to step 36.

The overstep ΔI for the duration ΔT are performed on a calibration test setup to reduce the hysteresis for a specific solenoid valve type by adjusting the overstep amount and duration. The overstep amount and duration may be a fixed amount, a percentage of maximum current, a percentage of instantaneous current, or continuously variable and may be chosen from any of the strategies described with respect to FIGS. 3–6.

Figure 3A:
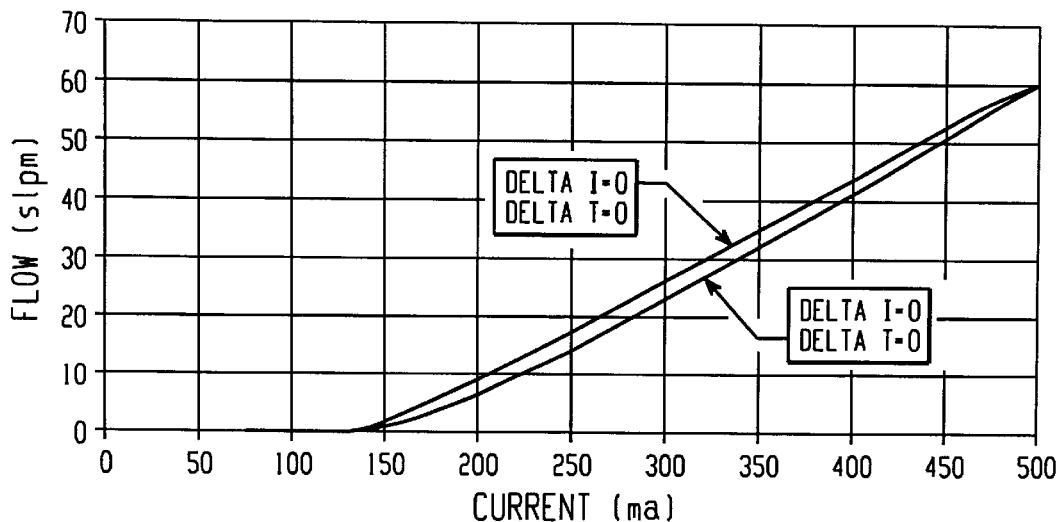
FIG. 3A is a graph of flow plotted as a function of solenoid current for $\Delta I=0:\Delta T=0$ for increasing and decreasing current.
Figure 3B:
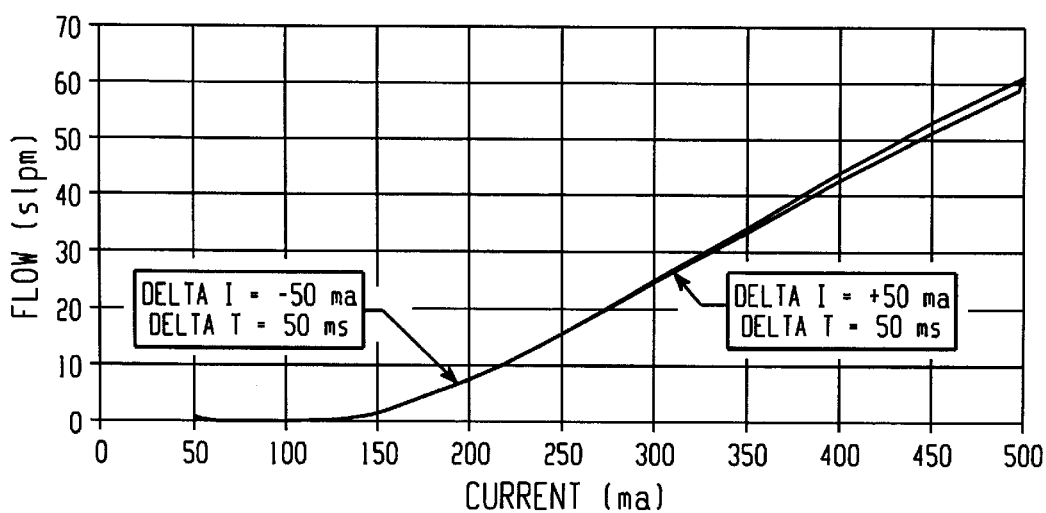
FIG. 3B is a graph of flow plotted as a function of solenoid current for a valve operated with $\Delta I=+/-50$ ma and $\Delta T=50$ milliseconds.

Referring to FIG. 3B, a plot of the flow through a solenoid operated valve of the present invention is a function of the solenoid current is plotted for an overstep and understep of 50 milliamps for a time duration of 50 milliseconds as compared to FIG. 3A, a similar plot without any overstep or understep for increasing and decreasing current.

Figure 4:
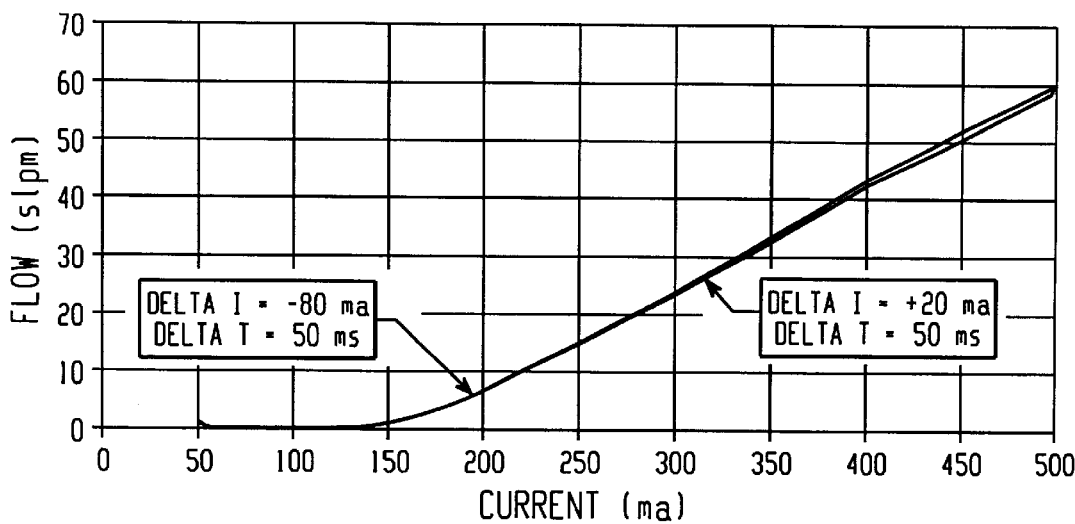
FIG. 4 is a view similar to FIGS. 3A and 3B where $\Delta I$ is +20–80 milliamps and $\Delta T$ is set equal to 50 milliseconds for operation of the valve in accordance with the present invention.

Referring to FIG. 4, current as a function of flow is plotted for an overstep and understep of 80 milliamps has been employed for a duration of 50 milliamps, respectively for both increasing and decreasing current sweeps.

Figure 5:
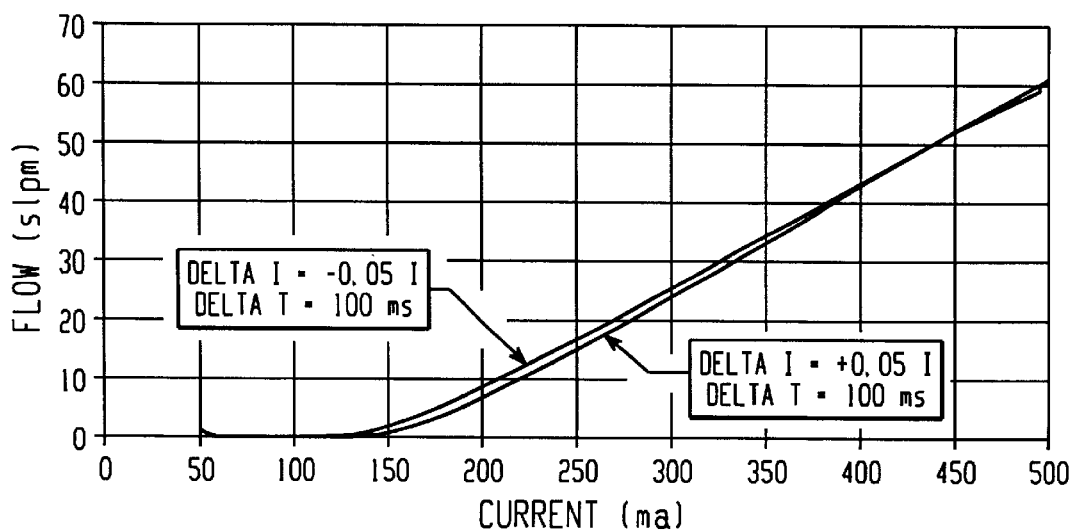
FIG. 5 is a view similar to FIGS. 3A and 3B for flow through the valve as a function of current for $\Delta I=+/-0.05I$ and $\Delta T=100$ milliseconds; and, FIG. 6 is a view similar to FIG. 5 with $\Delta I=+/-0.05I$ and $\Delta T=200$ milliseconds.

Referring to FIG. 5, an overstep and understep of five percent (5%) of the instantaneous current for a duration of 100 milliseconds has been employed for respectively increasing and decreasing current sweeps. A plot of low versus current for Δi=0 is also shown for comparison.

Figure 6:
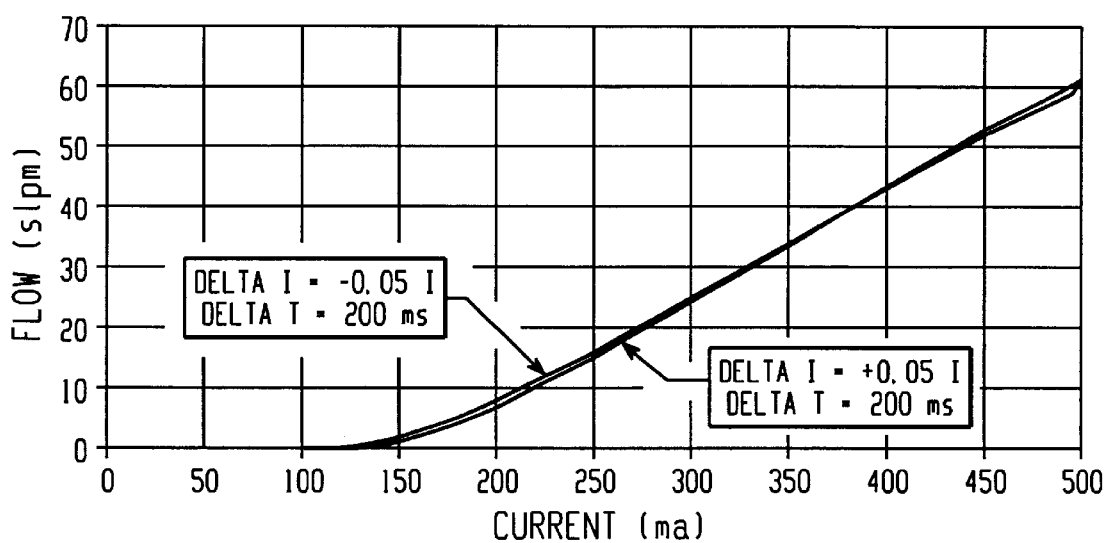

Referring to FIG. 6, an overstep and understep of five percent (5%) of the instantaneous current for a duration of 200 milliseconds has been employed for respectively increasing and decreasing current sweeps.

From the plots of FIGS. 3 through 6, it will be seen that as compared to increasing and decreasing energization of the solenoid operated valve without understep or overstep, i.e., for Δi=zero, that with the understep and overstep strategy of the present invention for energizing and de-energizing the solenoid operated valve, hysteresis may be almost entirely eliminated by a slight understep and overstep for a time duration amounting to a small fraction of the total period of energization. The present invention thus provides a unique and novel strategy for controlling the current for increasing and decreasing the flow in a solenoid operated valve and for decreasing the flow over a wide range of excitation current with a simple and relatively low cost electrical control strategy which substantially eliminates hysteresis in the control of the valve.

Although the invention has hereinabove been described with respect to the illustrated embodiments, it will be understood that the invention is capable of modification and variation and is limited only by the following claims.

What is claimed is:

1. A method of actuating a solenoid operated valve for providing fluid flow proportional to electrical energization with minimal hysteresis comprising:

(a) energizing the solenoid for increasing flow initially by a fractional amount of current in excess of the current required for the desired increased flow for a predetermined relatively short interval (overstep) and thereafter energizing the solenoid at the current required for the desired increased flow; and, (b) energizing the solenoid for decreasing flow initially by a certain amount of current less than the current required for the desired decreased flow for a predetermined relatively short interval (understep) and thereafter energizing the solenoid at the current required for the desired decreased flow whereby said overstep and understep minimize the hysteresis between energizing the coil for increasing and decreasing flow.

2. The method defined in claim 1, wherein the amount of overstep and understep of the target current for the desired flow is a value chosen in the range of about 5–20% of the maximum current for full flow.

3. The method defined in claim 1, wherein said steps of energizing at an understep and overstep for a predetermined time interval includes energizing for an interval chosen in the range of about 15–200 milliseconds.

4. The method defined in claim 1, wherein said steps of energizing by an understep and overstep (Δι) is in the range of about ten percent (10%) of the maximum current for full flow.

5. The method defined in claim 1, wherein said steps of energizing include dithering in the range of about 150–300 Hz.

6. The method defined in claim 1, wherein said steps of energizing by an understep and overstep (Δι) of the target current for a desired flow is chosen as about five percent (5%) of the instantaneous current.

* * * * *